United States Patent [19]
Ade

[11] Patent Number: 5,309,053
[45] Date of Patent: May 3, 1994

[54] CONDUCTOR EMBEDDED IN AN INJECTION MOLDED COMPONENT FOR THE COVER OF AN ELECTRIC MOTOR

[75] Inventor: Rolf Ade, Bietigheim-Bissingen, Fed. Rep. of Germany

[73] Assignee: SWF Auto-Electric GmbH, Fed. Rep. of Germany

[21] Appl. No.: 923,995

[22] PCT Filed: Dec. 2, 1991

[86] PCT No.: PCT/EP91/02271

§ 371 Date: Nov. 18, 1992

§ 102(e) Date: Nov. 18, 1992

[87] PCT Pub. No.: WO92/13381

PCT Pub. Date: Aug. 6, 1992

[30] Foreign Application Priority Data

Jan. 18, 1991 [DE] Fed. Rep. of Germany ....... 4101368

[51] Int. Cl.$^5$ .................... H02K 11/00; H02K 5/00
[52] U.S. Cl. ........................ 310/71; 310/89; 310/40 MM
[58] Field of Search ........... 310/40 MM, 71, 42, 310/43, 45, 89, DIG. 6

[56] References Cited

U.S. PATENT DOCUMENTS 4,792,307 12/1988 Stewart, Sr. .................... 439/26
4,845,396 7/1989 Huber .......................... 310/DIG. 6
5,063,317 11/1991 Bruhn ............................. 311/71

FOREIGN PATENT DOCUMENTS 0308689 of 0000 European Pat. Off. .
3228214 of 0000 Fed. Rep. of Germany .
3736388 of 0000 Fed. Rep. of Germany .
3838285 of 0000 Fed. Rep. of Germany .

Primary Examiner—Emanuel T. Voeltz
Assistant Examiner—Ed To
Attorney, Agent, or Firm—Dykema Gossett

[57] ABSTRACT

An electric motor used especially for driving windshield wipers of motor vehicles which includes a gear pot and a metal cover with an outside and an inside and a plastic component which is injection-molded substantially at the outside of the cover and into which at least one conductive strip punched out from a metal blank and positioned substantially at the outside is embedded. In order to achieve an exact position of the conductive strip, the conductive strip is supported by a holding device from the inside of the cover through an aperture in the cover during the injection molding process. The plastic component includes at least one recess within the aperture in the cover which is open towards the inside of the cover and extends up to the conductive strip, unless the recess is filled with material afterwards.

14 Claims, 6 Drawing Sheets

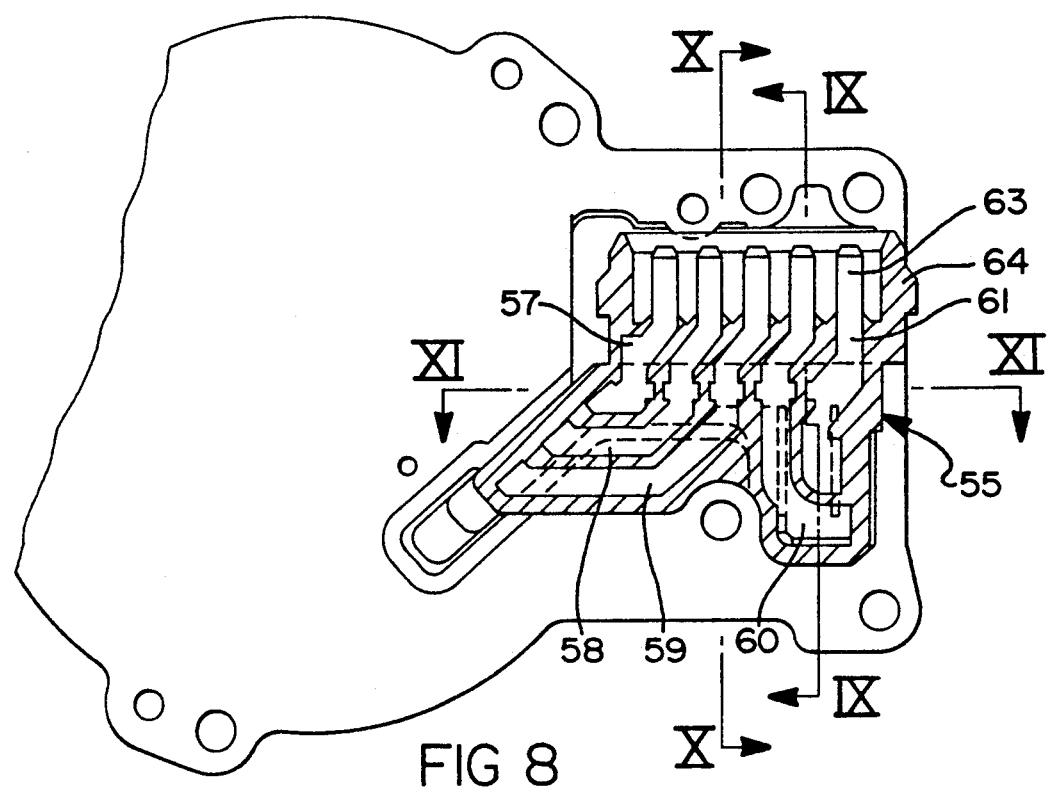
FIG 8
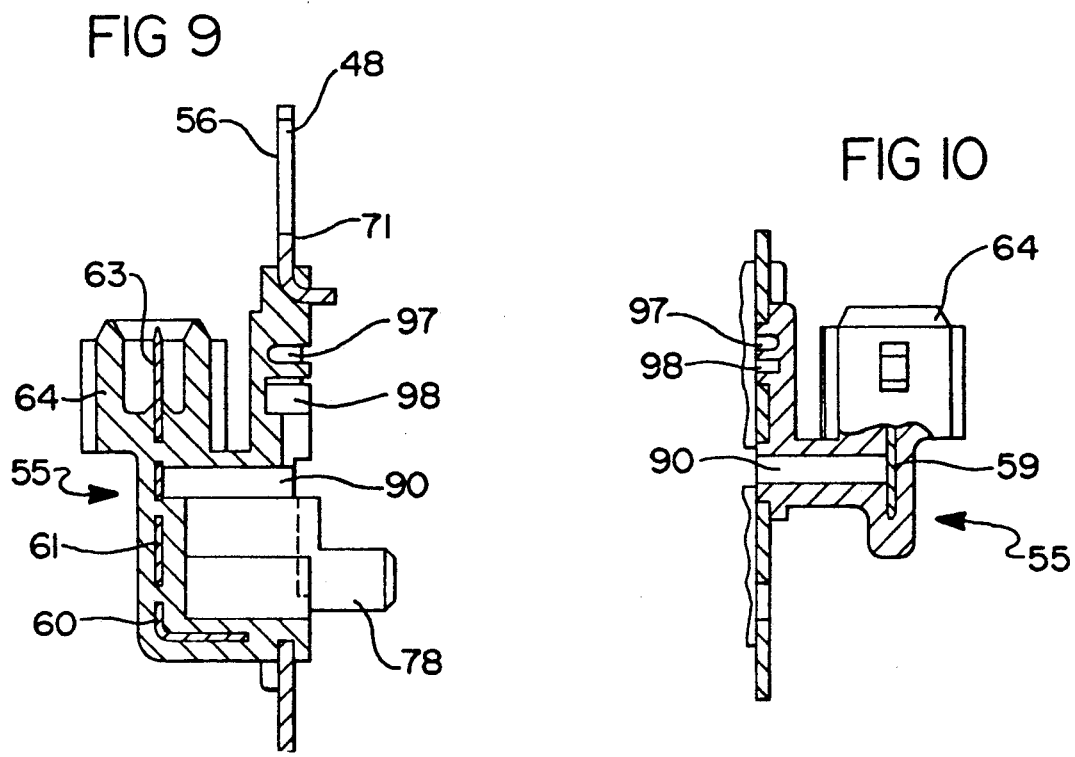
FIG 9
FIG 10

5,309,053

CONDUCTOR EMBEDDED IN AN INJECTION MOLDED COMPONENT FOR THE COVER OF AN ELECTRIC MOTOR

BACKGROUND OF THE INVENTION

The invention relates to an electric motor, especially to an electric small-power motor for driving windshield wipers of motor vehicles and more particularly relates to a method of manufacturing such an electric motor.

An electric motor of this type is disclosed in German patent document DE-OS 38 38 285 discloses an electric motor in which a gear pot is closed by a metal cover having an outside and an inside. A plastic component is injection-molded on the cover into which plastic component a conductive strip punched from a metal blank is embedded. In the cover, there is an aperture which is completely closed and an aperture which is open at the edge. The conductive strip runs from the outside of the cover to the inside through these apertures. The plastic component engages the cover at the inside through another aperture.

SUMMARY OF THE INVENTION

The object of the present invention is an electric motor in which the conductive strip can be held at a safe distance from the cover during the injection molding process. An additional object is the method of manufacturing such an electric motor.

This first object is achieved, according to the invention with respect to an electric motor having a cover with an aperture in the cover and a plastic component. The plastic component has at least one recess which is open towards the inside of the cover and which extends up to a conductive strip. The recess is formed by supporting the conductive strip through the aperture in the cover by means of a holding device during the injection molding process of the plastic component. By this support, a safe distance from the cover and thus a safe electric insulation of the conductive strip with respect to the cover is ensured.

The invention also includes a method of manufacturing an electric motor, which on the one hand ensures a safe distance between the conductive strip and the cover and on the other hand ensures that the conductive strips are separated from possible sections of blade terminals by being totally covered by plastic at the outside of the cover. This method differs from that described in the German patent document DE-OS 38 38 285 in that the conductive strip is supported by a holding device of the injection mold during the injection molding process. This holding device extends from the inside of the cover through an aperture of the cover up to the conductive strip.

If there are several conductive strips, they are first punched out of a metal blank, still being connected to each other, via one or several connecting webs, then they are inserted into the injection mold, also still being connected to each other. In the injection mold, they are separated by one or more separating dies, preferably without waste, and subsequently injection-molded by plastic, whereby during the injection-molding process a separating die serves as a holding device. The separating die cuts off the connecting webs from the inside of the cover through the aperture in the cover.

While cutting off the connecting webs, the conductive strips must be supported by at least one holding device on the side opposite the separating web in the area of the connecting webs. Advantageously, at least the one holding device is moved back from the conductive strips during the injection molding process. Thus, it is achieved in a simple manner that the conductive strips are not bare at the outside of the cover.

An embodiment according to the invention of an electric motor as well as an injection mold are illustrated in the drawings.

BRIEF DESCRIPTION OF THE DRAWINGS

FIG. 8 is a cross-section of the plastic component parallel to the cover at the level of the conductive strips.

FIG. 9 is a cross-section taken along the line IX—IX of FIG. 8.

FIG. 10 is a cross-section taken along the line X—X of FIG. 8.

DETAILED DESCRIPTION OF THE PREFERRED EMBODIMENT

Figure 1:
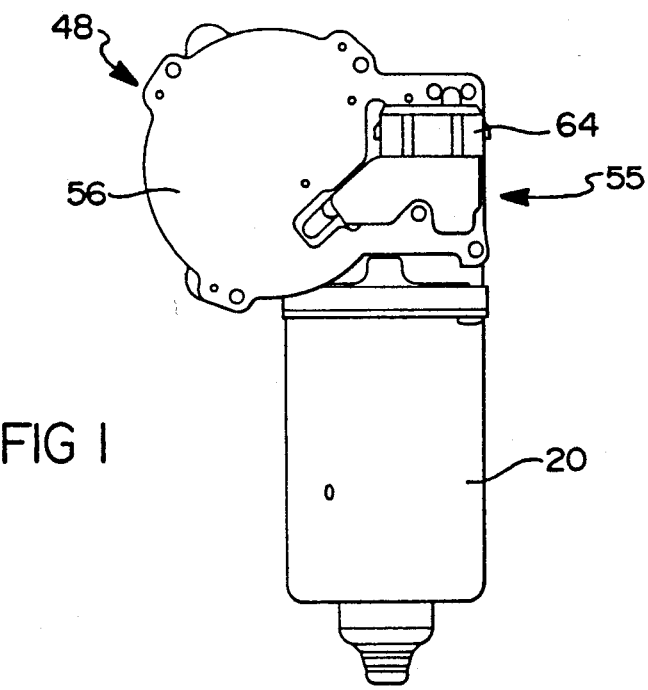
FIG. 1 is a plan view of an electric motor assembly according to the invention in a direction perpendicular to the cover of the gear pot or housing.
Figure 2:
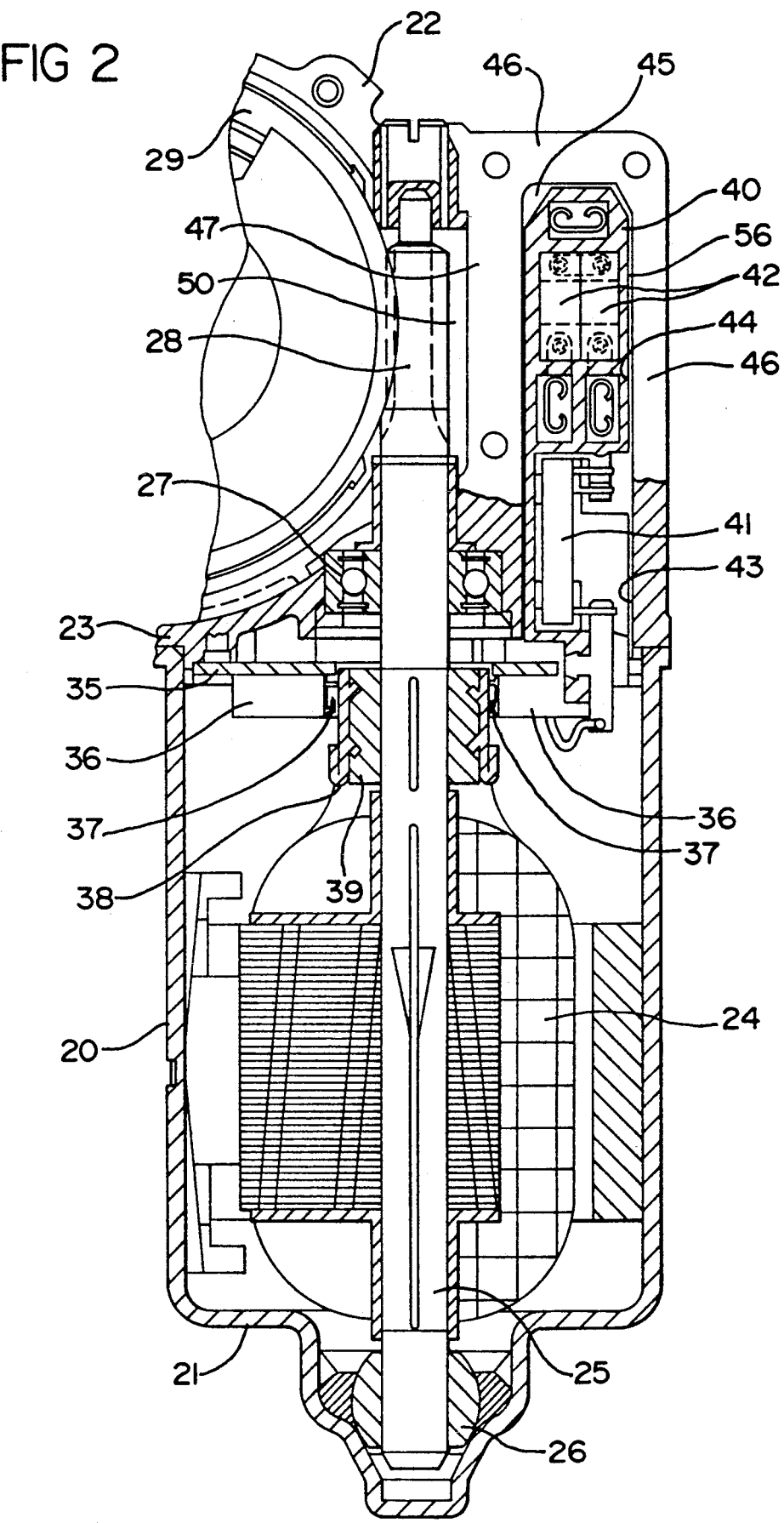
FIG. 2 in part is the longitudinal section of the electric motor of FIG. 1, and in part is the view of the gear pot or housing when the cover has been taken off.

The windshield wiper motor illustrated in FIGS. 1 and 2 has a deep-drawn, pot-like motor housing 20 with a bottom 21. At the open side, a gear pot or housing 22 with an end shield 23 is flanged onto the motor housing 20. The armature 24 of the motor, together with its shaft 25, is rotatably mounted in a calotte bearing 26 at the bottom 21 and in a ball bearing 27 at the inside of the end shield 23 pointing into the motor housing. The shaft of the armature 25 projects through an aperture in the end shield 23 into a compartment 50 of the gear pot 22 and there, it is formed as a worm 28 camming with a worm-wheel 29 mounted in the gear pot 22. A completely flat carbon brush support plate 35 is fixed onto the inside of the end shield 23. The carbon brush support plate 35 is located perpendicular to the shaft of the armature 25 and carries three metal tubes 36 on its side from end shield 23. Two of the three metal tubes 36 can be seen in FIG. 2. In the tubes 36, there are carbon brushes 37 lying on the lamellae 38 of the commutator 39 under pressure of a spring.

A holder 40 made from plastic extends perpendicularly from the side of the carbon brush support plate 35 facing the end shield 23. Two interference support coils 41 and two interference support capacitors 42 are inserted into holder 40. The holder 40 penetrates a passage 43 of the end shield 23, closes towards the outside and lies in a compartment 50 of the gear pot 22. Compartment 50, looked at it from the point of view of the worm-wheel 29, is situated beyond the worm 28. The compartment 44 is enclosed towards the outside by the bottom 45 and the side walls 46 of the gear pot 22. The compartment 44 is separated from the compartment 50 of the gear pot 22, in which are located the worm 28 and the worm-wheel 29, by a partition 47 which runs parallel to the worm 28 and is as high as the side walls 46 of the gear pot 22. The upper edges of the side walls 46 and of the partition 47 of the gear pot 22 serve as support areas for a cover 48 which is punched out from a flat metal blank and by which the gear pot 22 including the compartment 44 are closed. Also in the area of the passage 43, the support edge for the cover 48 runs along the end shield 23 so that the cover 48 can seal the compartment 44. Of course, a flat seal can be put between the cover 48 and gear pot 22.

Figure 4:
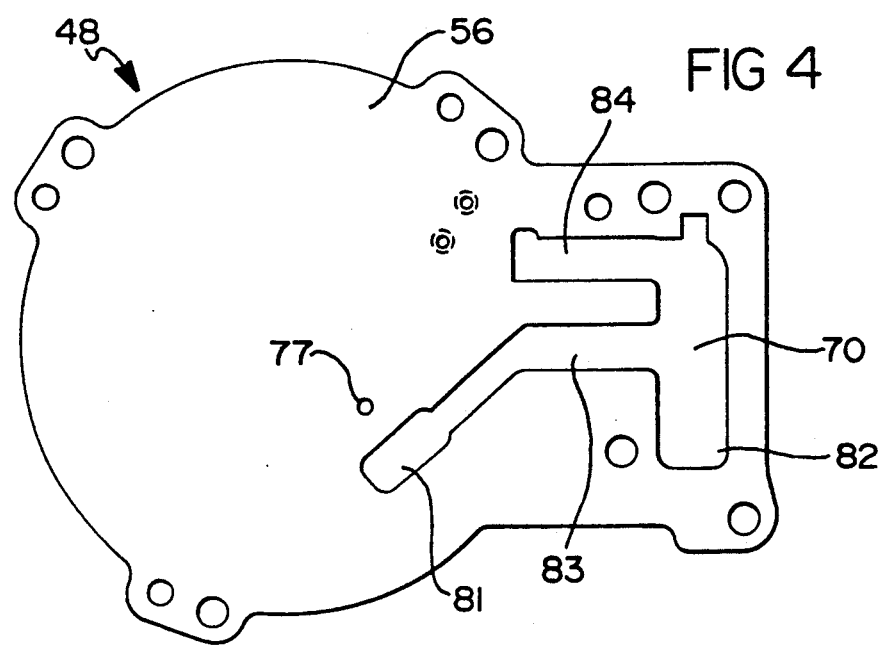
FIG. 4 is a plan view of the cover of FIGS. 1 and 3 without conductive strips and plastic component.
Figure 5:
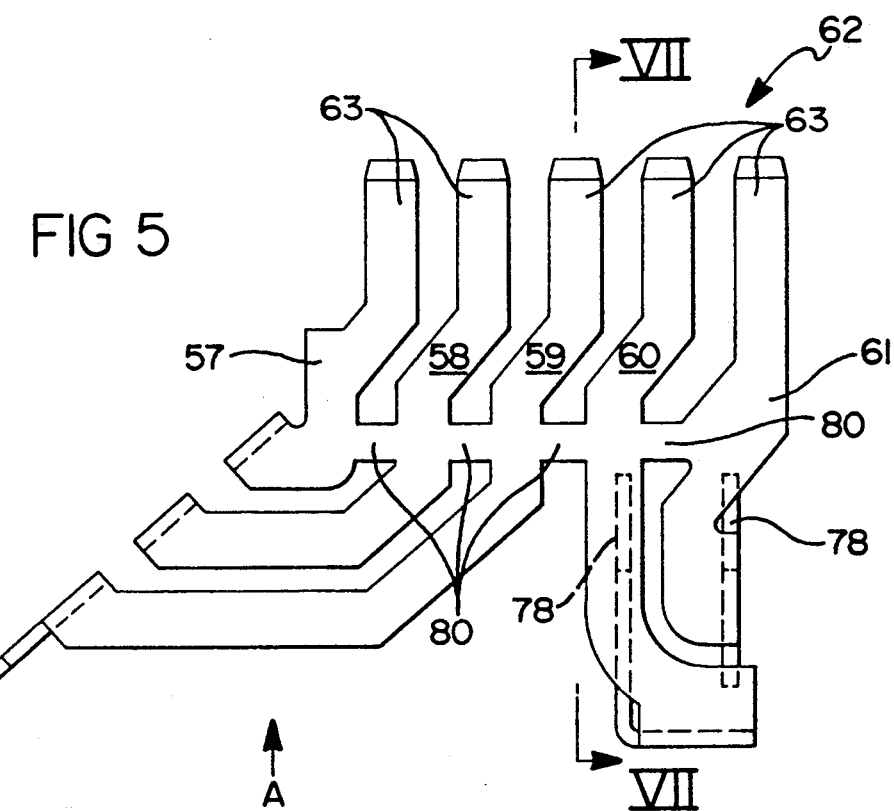
FIG. 5 is a plan view of a pressed screen with five conductive strips for embedding into the plastic component which is injection-molded onto the cover.
Figure 6:
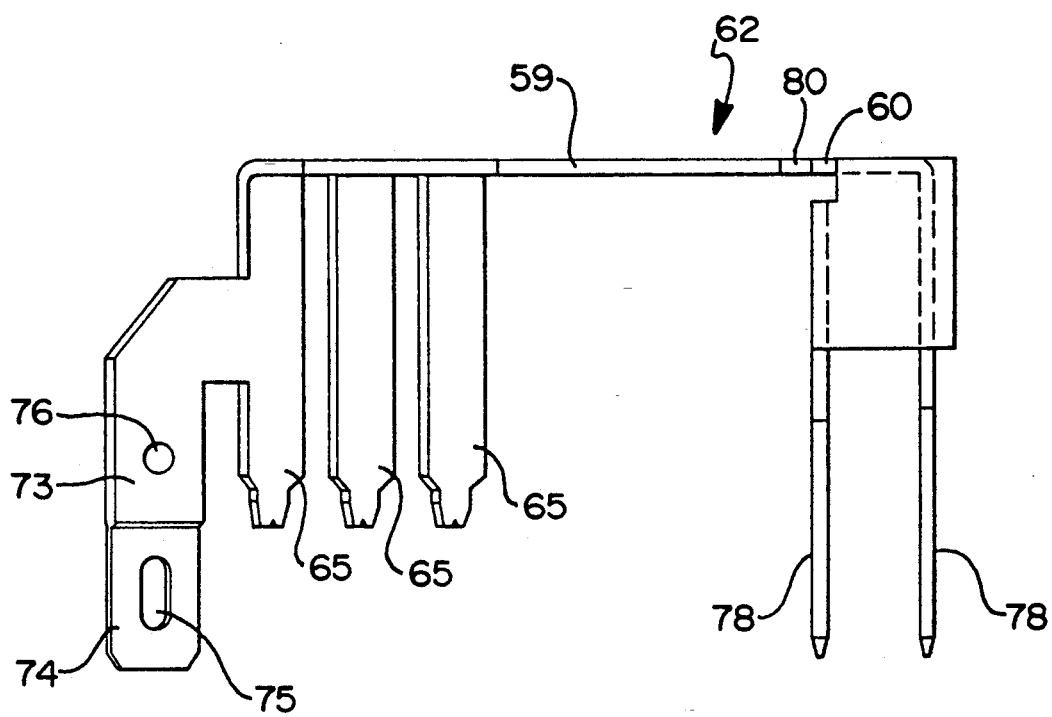
FIG. 6 is a side view of the pressed screen of FIG. 5 in the direction of arrow A.

A plastic component 55 is formed onto the cover 48 substantially at the outside 56 of the cover 48 as a plug housing into which five conductive strips 57 to 61 are embedded. The conductive strips 57 to 61, as illustrated in FIG. 5, are punched out as a whole pressed screen 62 from a metal blank and mostly lie in a plane parallel to the plane of the cover 48. At the one end the conductive strips, blade terminals 63 are formed which are arranged in parallel to each other and parallel to the cover 48 on their flat sides and which project into a section 64 of the plastic component 55 serving as a holding frame for a counter terminal. The ends of the conductive strips lying opposite the blade terminals 63 are bent into a direction perpendicular to the cover 48 and penetrate through an aperture 70 of the cover into the interior of the gear pot 22. See FIG. 4. The ends 65 of the conductive strips 57, 58, and 59 lie in one plane on their flat sides and project toward the inside 71 of the cover 48 only slightly. A brush spring 72, fixed onto each end 65 of the conductive strips 57 to 59, is part of a parking position switch of the wiper motor not illustrated any further, but which is formed in a generally known manner. See FIG. 3.

Figure 3:
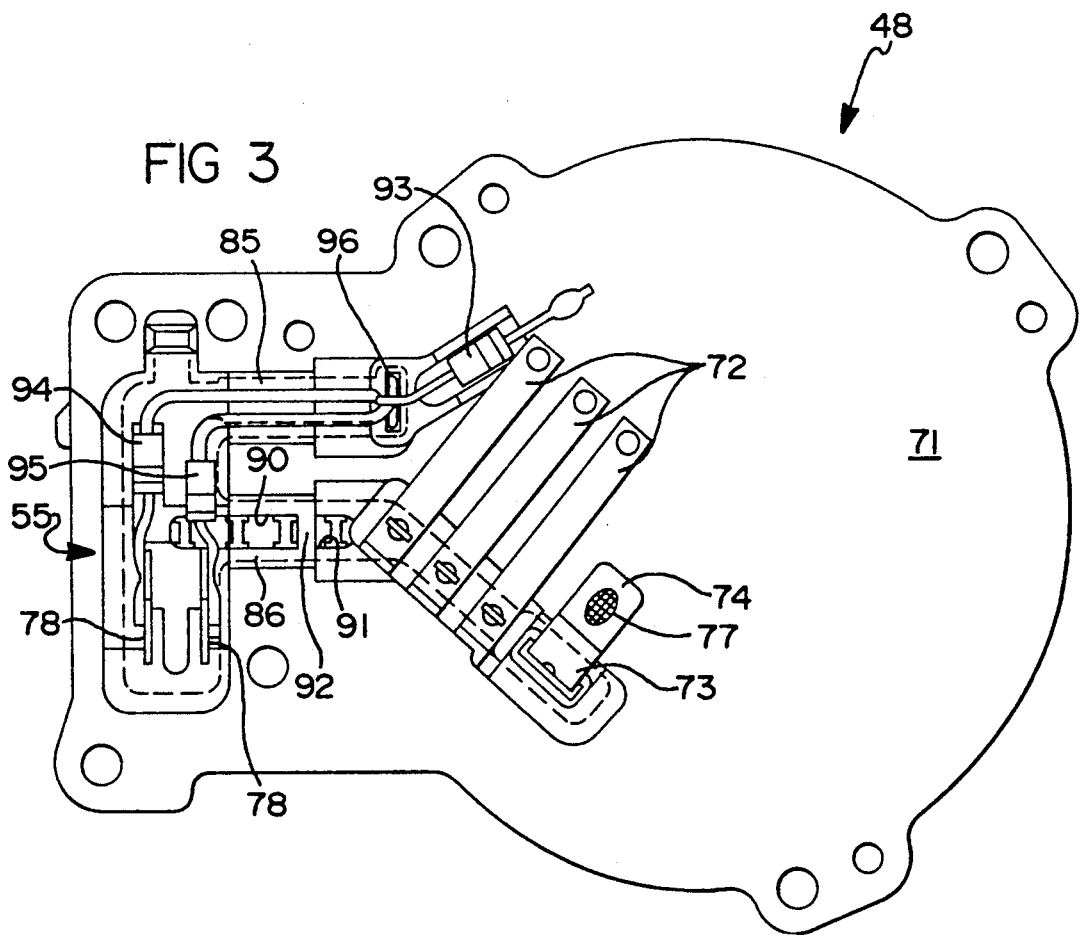
FIG. 3 is a plan view of the inside of the cover of FIG. 1.

A section of a metal blank 73 extends laterally to the end 65 of the conductive strip 59. At first, after punching out and bending the pressed screen 62, section 73 points in the same direction as the ends 65 and projects from them. The end 74 of the section of the metal blank 73 is formed of a thinner cross-section than the conductive strips and is provided with an elongated hole 75. In the thicker part of the section of the metal blank 73, there is an aperture 76 providing a predetermined bending point in the section of the metal blank 73. As can be seen in FIG. 3, after the pressed screen 62 has been embedded into the plastic component 55, the section of the metal blank 73 is bent at the predetermined bending point in such a way that it lies at the inside 71 of the cover 48. Thereby a pressed-in button 77 of the cover 48 enters the elongated hole 75. Then the button is caulked so that the end 74 of the section of the metal blank 73 is held on the cover and an electric connection to the cover is realized. The thickness of the end 74 of the section of the metal blank 73 is reduced because the thickness of the material from which the cover 48 has been punched out permits a certain height of the button 77.

Figure 7:
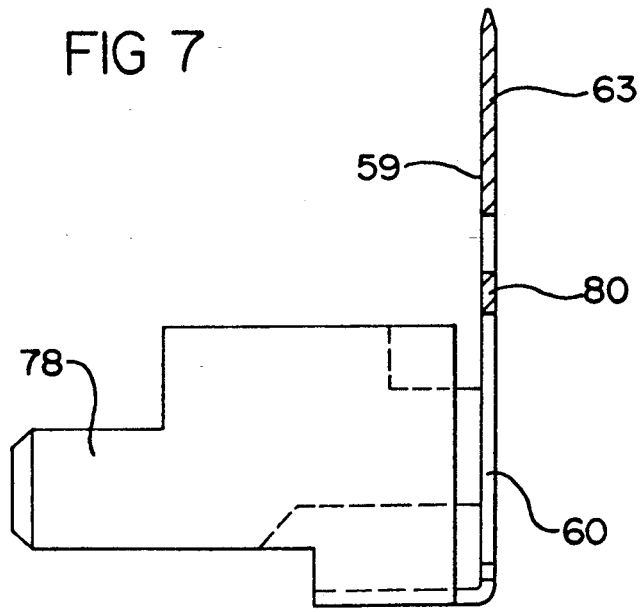
FIG. 7 is a cross-section of the pressed screen taken along the line VII—VII of FIG. 5.

The ends of the conductive strips 60 and 61 opposite the blade terminals 63 form blade terminals 78 which, like the ends 65 of the conductive strips 57 to 59, are directed perpendicularly to the plane of the cover 48, but project past the ends 65 to a large extent. The direction and the correct position of the blade terminal 78 of the conductive strip 61 is achieved by simply bending the blade terminal 90° around a bending edge lying in the plane of the blade terminal 63 which may be designated as a preferred plane of the pressed screen 62. In order to bring the blade terminal 78 of the conductive strip 60 into the necessary direction and desired position, two 90° bends, each around two bending edges arranged perpendicularly to each other, is needed. When the pressed screen 62 is completely bent, the two blade terminals 78 lie exactly opposite each other on two flat sides as shown in FIGS. 3, 5 and 7.

In order to be able to handle the pressed screen 62 as a sole component, narrow connecting webs 80 have been left between the conductive strips during the punching operation. As it can clearly be seen in FIG. 5, each conductive strip is connected to the adjacent conductive strip via a sole connecting web 80 resulting in a total of four connecting webs 80 for the five conductive strips 57 to 61. These connecting webs 80 lie in the preferred plane of the pressed screen 62 and are arranged in a straight line, one behind the other.

In order to make the ends 65 of the conductive strips 57, 58 and 59, the section of the metal blank 73, and the two blade terminals 78 of the conductive strips 60 and 61 penetrate from the outside 56 of the cover 48 to the inside 71, it is only necessary to break through the cover in the area of said ends of the conductive strips. For handling the pressed screen 62 in the injection molding machine and for holding additional electric units on the plastic component 55 and for fastening this part on the cover 48 in a better way, however, a sole aperture 70 is provided, as shown in FIG. 4. In this aperture 70, the area 81 for the penetration of the ends 65 and of the section of the metal blank 73 and the area 82 for the penetration of the blade terminals 78 are connected to each other via an area 83. There is also an area 84.

The plastic component 55, apart from two areas 85 and 86 overlaps the inside 71 of the cover 48 at the edge of the aperture 70 and is thus fixed on it. The two areas 85 and 86 are positioned above the partition 47 of the gear pot 22. In these areas, the plastic component 55 is in alignment with the inside 71 of the cover. However, by beveling the edge of the aperture 70 a little, in the areas 85 and 86, an undercut for the plastic component 55 can be achieved so that plastic component 55 is safely held and aperture 70 in cover 48 is sealed well. Apart from the blade terminals 63, the plastic component 55 completely covers the conductive strips 57 to 61 at the outside 56 of the cover 48.

Figure 11:
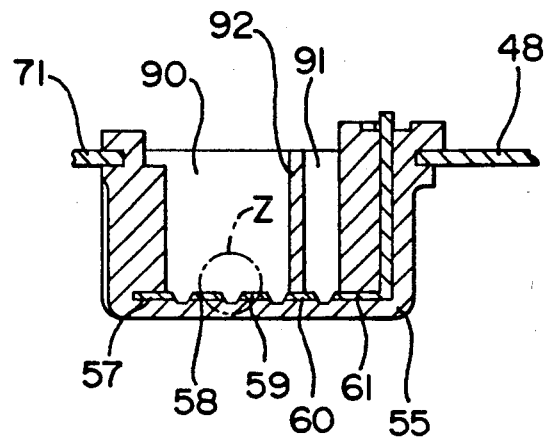
FIG. 11 is a cross-section taken along the line XI—XI of FIG. 8.

In the area 83 of the aperture 70, above which there are connecting webs 80 of the pressed screen 62 before embedding them into plastics, the plastic component 55 has two recesses 90 and 91, which, as it is made clear in FIG. 3 and especially in FIGS. 9, 10 and 11 are open towards the inside 71 of the cover 48 and extend up to the conductive strips. The two recesses 90 and 91 are shielded against each other in the area 86 of the plastic component 55 by a separating web 92 which according to its position within the area 86, is in alignment with the inside 71 of the cover 48. Separating web 92 prevents oil in the compartment 50 of the gear pot 22 from reaching the compartment 44 and from there possibly even reaching the commutator in the motor housing 20.

FIG. 10 makes clear that plastic material is left between the recesses 90 and 91 of the plastic component 5 and the edge of the aperture 70. Recesses 90 and 91 are narrower than the aperture 70 so that the plastic component 55 can engage the cover 48 in the area of the recesses 90 and 91.

At the inside 71 of the cover 48, the plastic component 55 receives three diodes 93, 94 and 95 in three flat recesses. The diode 93 is welded to the cover 48 via a lead. The diode 94 is welded to one blade terminal 78 via a lead and the diode 95 is welded onto the other blade terminal 78 via a lead. All three diodes are soldered to a soldering joint 96 inserted into the plastic component 55 from the inside 71 of the cover 48 via the other leads. The two leads of the two diodes 94 and 95 located in the compartment 44 of the gear pot run in two channels 97 and 98. The channels are filled by the leads to a large extent so that via them no oil can penetrate from the compartment 50 to compartment 44 of the gear pot.

Figure 12:
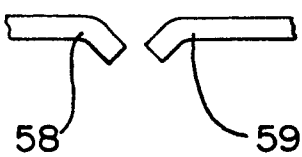
FIG. 12 is the enlarged view of detail Z of FIG. 11 depicting two adjacent conductive strips after cutting off the connecting web without waste.
Figure 13:
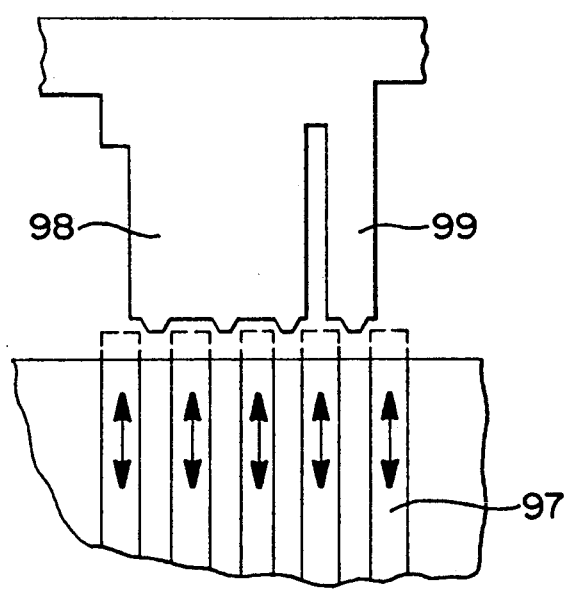
FIG. 13 is a schematic view of an injection mold for manufacturing a plastic component with embedded conductive strips injection molded on a cover, as shown in the preceding figures.

The assembly shown in the FIGS. 8 to 11 consisting of the cover 48, the conductive strips 57 to 61 and the plastic component 55, is manufactured by first inserting the cover 48 and the pressed screen 62 are inserted into an injection mold. The pressed screen 62 is supported at the outside by the movable holding devices 97 and moved ahead in the direction of the double arrows according to FIG. 13 and at the inside by the two separating dies 98 and 99 penetrating the aperture 70 of the cover 48. The separating dies 98 and 99 when closing the injection mold, cut off the connecting webs 80 between the conductive strips; thereby, forming the connecting web between the two conductive strips in the way as illustrated in FIG. 12. When the plastic is injection-molded, the separating dies 98 and 99 maintain their position and serve as holding devices, whereas the holding devices 97 are moved back up to the level of the surface of the mold surrounding the holding devices 97, when a certain degree of filling of the mold is achieved. Thus the conductive strips are completely covered. The two separating dies 98 and 99 are spaced a distance apart from each other and the separating web 92 is formed between them during the injection process.

After the manufacture of the component according to FIGS. 8 to 11 the diodes 93, 94 and 95 are assembled and the section of the metal blank 73 is bent and riveted on the cover. Then the cover 48 can be put onto the gear pot 22 in which there are already the gear members and holder 40 with the interference suppressor units 41 and 42. Electric connections between the blade terminals 78 and these units are thereby also realized. Afterwards, the recesses 90 and 91 can at least partly be filled with sealing compound.

What is claimed is:

1. An electric motor comprising:
   a gear pot;
   a metal cover generally covering the gear pot, the cover having an outside and an inside, the inside in general alignment with a plane and facing inside of the gear pot, and the cover having an edge defining an aperture in the cover, the aperture communicating between the outside and the inside;
   a plastic component being made of plastic material which is injection-molded substantially onto the outside of the cover and into said aperture, the plastic component having at least one recess open to the inside of the cover;
   at least one conductive strip substantially juxtaposed to the outside of the cover, the at least one conductive strip having at least one blade terminal that is aligned in a plane substantially parallel to the plane in which the inside of the cover is aligned, said recess extending generally perpendicularly to said at least one blade terminal, through said aperture, and to said at least one conductive strip and, the at least one conductive strip being embedded in the plastic component, said recess extending from inside the gear pot to the at least one conductive strip.

2. An electric motor according to claim 1, wherein plastic material is disposed between the recess and the edge of the cover defining the aperture in the cover.

3. An electric motor according to claim 1, further comprising gear members and electric units, and wherein the gear pot includes a first compartment for the gear members and a second compartment for the electric units, wherein said plastic component has at least two recesses, one recess extending from each of said first and second compartments to at least one conductive strip, and wherein the recesses are shielded from each other.

4. An electric motor according to claim 3, further comprising a partition between the first and second compartments and wherein the plastic component includes a separating web, the recesses being within the same aperture in the cover and are separated from each other by the separating web of the plastic component, the separating web extending from said at least one conductive strip to the partition between said first and second compartments of the gear pot.

5. An electric motor according to claim 4, wherein the separating web extends to the plane in alignment with the inside of the cover.

6. An intermediate article of manufacture for a cover for a gear pot of an electric motor, the cover including an outside and an inside, a plastic component injection-molded substantially onto the outside and having at least one recess open towards the inside, and several conductive strips positioned substantially at the outside and embedded in the plastic component, the intermediate article comprising: said conductive strips including separable connecting webs, said at least one recess being adjacent said connecting webs before said connecting webs are separated.

7. An intermediate article according to claim 1, wherein at least two of said connecting webs are arranged in one line.

8. A cover assembly for a gear pot of an electric motor, the cover assembly comprising:
   a metal cover disposed generally in a plane and having an outside and an inside, the inside for facing inside of the gear pot when the cover assembly is assembled onto the gear pot, the cover having an edge defining an aperture in the cover, the aperture communicating between the outside and the inside;
   a plastic component made of plastic material injection-molded substantially onto the outside of the cover and into said aperture, the plastic component having at least one recess open to the inside of the cover;
   at least one conductive strip embedded in the plastic component adjacent the outside of the cover, the at least conductive strip having at least one blade terminal that lies in a plane substantially parallel to the plane in which the cover is disposed, said recess extending generally perpendicularly to said at least one blade terminal, through said aperture to said at least one blade terminal.

9. A cover assembly according to claim 8, wherein plastic material is disposed between the recess and the edge of the cover defining the aperture.

10. A cover assembly according to claim 9, wherein said plastic component has at least two recesses separated from each other along the full extension of each recess.

11. A cover assembly according to claim 10, wherein the plastic component includes a separating web, the at least two recesses being within the same aperture in the cover and being separated from each other by the separating web of the plastic component, the separating web extending from said at least one conductive strip to a plane in alignment with the inside of the cover.

12. A cover assembly according to claim 10, wherein the plastic component includes a separating web, the separating web separating two recesses from each other and the separating web extending from said at least one conductive strip to a plane in alignment with the inside of the cover.

13. A cover assembly according to claim 8, wherein the at least one conductive strip is embedded in the plastic component adjacent the outside of the cover, the at least one conductive strip being bent to have at least one end projecting perpendicularly to the cover and through the aperture toward the inside of the cover.

14. A cover assembly according to claim 13, wherein the at least one conductive strip is a plurality of conductive strips, several of which conductive strips have flat sides that are all disposed in one plane.

* * * * *